United States Patent Office 3,349,010
Patented Oct. 24, 1967

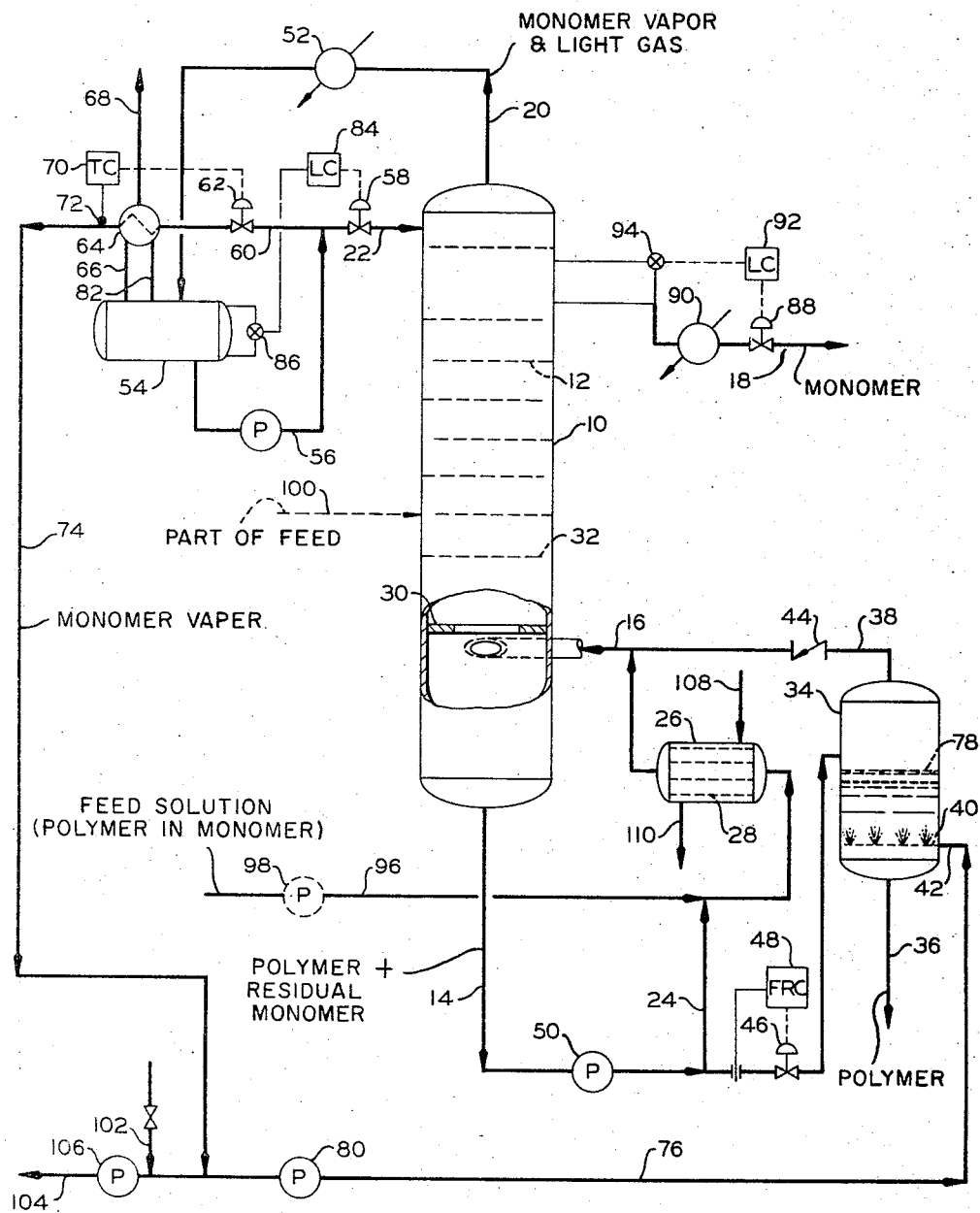

3,349,010
METHOD AND APPARATUS FOR CONTROLLING POLYMER DEPOSITION IN REBOILER
William E. Plaster, Bartlesville, Okla., assignor to Phillips Petroleum Company, a corporation of Delaware
Filed Dec. 10, 1964, Ser. No. 417,426
6 Claims. (Cl. 203—99)

ABSTRACT OF THE DISCLOSURE

In separately recovering light hydrocarbon and polymer from a solution of polymer in the hydrocarbon in a fractionation column utilizing an indirect heat exchange reboiler for supplying heat to the column, wherein polymer tends to deposit in the tubes of the reboiler, at least a substantial portion of the solution feed to the column is fed into the reboiler stream upstream of the reboiler to increase flow rate through the reboiler tubes, decrease polymer concentration in the reboiler stream, and prevent polymer deposition in said tubes.

This invention relates to a process and apparatus for decreasing and/or preventing polymer deposition in a reboiler functioning in association with a distillation column engaged in recovery of solvent from a solution of polymer in said solvent.

This invention is an improvement in the operation of the process and apparatus of the copending application of J. J. Moon entitled "Preparation of Soluble Polymer and Catalyst Residues for Disposal," Serial No. 228,711, filed, October 5, 1962, now Patent No. 3,257,372.

In the operation disclosed in the aforesaid copending application, solvent is being recovered from a washing stream from a polymerization process wherein both solid and soluble polymer are present. The washing agent is the same monomer as used in the polymerization step. This stream of monomer and soluble polymer is fed into a conventional distillation column utilizing an indirect heat exchanger as a reboiler thru which a portion of the effluent bottoms stream from the fractionator, containing soluble polymer in higher concentration than in the feed stream to the column, is passed thru the tubes of the reboiler and there heated by indirect heat exchange with a heating fluid to provide the reboiled fluid to operate the column. Due to the concentration of polymer in the reboiled liquid and the low flow rate thru the reboiler tubes, considerable difficulty has been experienced in maintaining the reboiler in service. This reboiler has become fouled by polymer deposition in the heat exchange tubes in periods of operation in the range of about 8 hours to 8 weeks. Such fouling requires cleaning out of the tubes with loss of service of the reboiler during the cleaning period. When preparing the copolymer of propylene and ethylene in which the propylene is the major component, the reboiler was fouled in a period of about 8 hours, while fouling required from one to eight weeks when producing homopolymers of propylene.

This invention is concerned with a process and apparatus for decreasing or completely avoiding polymer deposition in the reboiler tubes in service in such a process as that described in the preceding paragraph.

Accordingly, it is an object of the invention to provide a process and apparatus for decreasing or preventing polymer deposition in the heat exchange tubes of a reboiler in service in association with a distillation column effecting recovery of light hydrocarbon solvent or wash liquid containing soluble polymer. Another object is to provide a novel and improved method of introducing liquid hydrocarbon feed containing soluble polymer to a distillation column. Another object is to increase the liquid flow rate and decrease the polymer concentration in reboil liquid passing through a reboiler operating in conjunction with a fractionating column which is making a separation between light liquid hydrocarbon material and soluble polymer. Other objects of the invention will become apparent to one skilled in the art upon consideration of the accompanying disclosure.

A broad aspect of the invention comprises passing a liquid hydrocarbon feed containing soluble polymer to a fractionating column making a separation of liquid hydrocarbon from the polymer or solution of polymer in liquid hydrocarbon material, thru the reboiler tubes in admixture with the reboil liquid containing soluble polymer. This increases flow rate of liquid thru the tubes and decreases the concentration of the polymer in the liquid passing thru the reboiler, thereby doubly contributing to the prevention of polymer deposition in the heat exchange tubes. The invention is applicable to the recovery of any light hydrocarbon liquid from a solution of polymer therein to alleviate polymer deposition problems in the indirect heat exchange tubes of the reboiler. The technique of introducing the feed stream to the column in the recycled bottoms stream passing thru the reboiler just upstream of the reboiler, is effective in retarding polymer deposition in a boiler engaged in furnishing reboil liquid to any distillation column in operation in recoverng liquid hydrocarbon material from a solution of polymer in such hydrocarbon liquid. The olefins and polymers thereof to which the invention is applicable include 1-olefins having a maximum of 8 carbon atoms per molecule and the diolefins such as butadiene. Usually the liquid hydrocarbon in the solution being fed to the distillation column is the monomer from which the polymer is solution is formed, but this is not necessarily the case, it being within the scope of the invention to separate propylene washing liquid from soluble polyethylene for example. In other words any light hydrocarbon liquid containing dissolved polymer is amenable to separation in a distillation column utilizing the method and apparatus of this invention.

A more complete understanding of the invention may be had by reference to the accompanying schematic drawing which shows an arrangement of apparatus or process flow in accordance with the invention.

Referring to the drawing, a fractional distillation column 10 is provided with a number of trays 12, a bottoms effluent line 14, a reboil liquid feed line 16, a side stream take-off line 18, an overhead vapor line 20, and a reflux inlet line 22. A conduit 24 having reboiler 26 positioned therein, connects bottoms effluent line 14 with reboil liquid feed line 16. Reboiler 26 is provided with the usual heat exchange tubes 28. Line 16 enters the bottom section of column 10 tangentially below ring 30 which is positioned just below the bottom tray 32. This structure and method for introducing the reboil liquid containing soluble polymer is the claimed subject matter in copending application S.N. 418,190, filed December 14, 1964.

Line 14 connects with stripping vessel 34 which is provided with a bottoms outlet line 36, an overhead vapor line 38, and a sparger or distribution ring 40 connected with vapor or gas inlet line 42. Overhead vapor line 38 connects with reboil liquid feed line 16 and is provided with a check valve 44 for preventing backflow of reboil liquid into the stripping vessel 34. A motor valve 46 in line 14 is operated by flow rate controller 48 which is set to proportion the flow of bottoms liquid between line 24 and line 14 downstream of line 24, thereby controlling the proportion of reboil liquid and liquid passing to disposal thru stripping vessel 34 and line 36. A pump 50 in line 14 upstream of line 24 circulates bottoms liquid thru reboiler 26 and also the divided bottoms stream passing into vessel 34.

Overhead vapor line 20 passes thru a condenser or cooler 52 and into accumulator 54. Conduit 56 connects with the bottom of accumulator 54 and with line 22 just upstream of valve 58. Line 60 contains a motor valve 62 and connects with line 56 for passage of condensed light hydrocarbon thru condenser 64. Vapor from accumulator 54 passes thru line 66 into condenser 54 and the uncondensed gas escapes or is vented thru line 68. Refrigeration or cooling in condenser 64 is provided by reducing the pressure on the fluid in line 60 by cracking valve 62 which is operated by temperature controller 70 which is sensitive to the temperature in line 60 at point 72. This vaporized hydrocarbon from line 60 downstream of valve 62 passes thru lines 74 and 76 into vapor inlet line 42 as stripping gas for bottoms liquid 78 in vessel 34. Pump 80 in line 76 compresses the vapor thereby heating same to increase the efficiency of the stripping gas in vessel 34 and recover more liquid hydrocarbon from the bottoms effluent.

Condensate from condenser 64 is returned to accumulator 54 thru line 82. A liquid level controller 84 is connected with a liquid level sensing device 86 on accumulator 54 and operates valve 58 to permit flow of condensate hydrocarbon into the upper section of column 10 thru line 22 to serve as reflux.

A motor valve 88 and a condenser or cooler 90 are positioned in line 18 which takes of a product side stream, usually olefin monomer, as the recovered wash liquid of the process. Liquid level controller 92 is connected with liquid level sensing device 94 and with motor valve 88 to maintain a selected liquid level on a tray in the upper section of column 10.

The feed line to the process or apparatus is line 96 which may contain pump 98 if needed to provide the required inlet pressure in line 96. Usually, the stream in line 96 is at sufficient pressure as it comes from the polymer washing step of the process to permit introduction to line 24 without need of pump 98. The most important aspect of the invention is the connecting of line 96 with line 24 upstream of reboiler 26 which passes the feed to column 10 thru the indirect heat exchange tubes 28 in reboiler 26. While it is preferred to pass all of the feed thru line 96, it is feasible to introduce a portion of the feed directly thru line 16 or thru an auxiliary feed line such as line 100. However, in most installations the prevention of polymer deposition is facilitated by passing all of the feed to the column thru line 96 and thru reboiler 26.

In the event additional olefin vapor is required in the stripping vessel 34, same may be introduced thru line 102. In the event excess olefin vapor is passing thru line 74, this excess may be passed thru line 104 under the impetus of pump 106 to any suitable use.

A typical application of the apparatus and process of the invention is in the recovery of propylene from a solution of soluble polypropylene in the propylene monomer. In such a process the feed stream is introduced at a temperature in the range of about 110–125° F. and the bottom stream temperature is in the range of 120–130° F., the difference in temperature being provided by heat exchanging the liquid in line 24 passing thru reboiler 26 with heat exchange fluid passed into the reboiler thru line 108 and withdrawn thru line 110. Pressure in the column is maintained at about 275 p.s.i.a. and the top column temperature is maintained at about 110–112° F. The operating variables necessary for separation of liquid olefins from soluble polymer therein are well known in the art and are not a part of the instant invention. Further details as to operating variables are therefore not set forth in detailed form herein.

The soluble polymer contained in the feed in stream 96 is recovered in line 36 after stripping a substantial proportion of monomer therefrom in both stripping vessel 34 and column 10, and the residual polymer containing unrecovered monomer is passed thru line 36 to suitable use or disposal not connected with the invention.

Apparatus substantially as shown in the drawing has been used in the recovery of propylene from a solution of soluble polymer in propylene substantially as described herein and more fully described in copending application S.N. 228,711, for a period of more than two months without any fouling of the tubes in reboiler 26. This is in distinct contrast to operation with the same feed stream prior to the instant invention wherein all of the feed was introduced thru line 100. With this same type of stream and operating conditions, injecting all of the feed thru line 100 and passing only a portion of the bottoms stream in line 14 through reboiler 26, fouling occurred in a period of anywhere from one to eight days. This illustrates the substantial advantage of the invention in plant operation in avoiding polymer deposition in the heat exchange tubes of the reboiler.

Certain modifications of the invention will become apparent to those skilled in the art and the illustrative details disclosed are not to be construed as imposing unnecessary limitations on the invention.

I claim:

1. In a process for recovering wash liquid substantially free of polymer from washings obtained by washing a solid olefin polymer in admixture with soluble polymer of the same olefin and monomer of said olefin comprising the steps of:
   (a) feeding said washings into a fractional distillation column and there distilling same so as to recover an overhead vapor stream of said monomer and lighter material in minor amount, a bottoms liquid stream of said monomer and said soluble polymer of substantially higher polymer concentration than in said washings, and a side stream of said monomer substantially free of said light material as the recovered wash liquid;
   (b) passing a substantial portion of the bottoms stream of step (a) in liquid form thru indirect heat exchange tubes of a reboiler to heat said stream and returning the heated liquid stream to the bottom section of said column as reboil liquid wherein there is a tendency for polymer to deposit in said tubes;
   the improvement comprising:
   (c) prior to feeding a substantial portion of the washings into the fractional distillation column admixing the washings feed of step (a) with the bottoms stream of step (b) upstream of said reboiler so as to increase the flow rate of liquid thru said tubes and decrease the concentration of soluble polymer in the mixed stream, thereby decreasing the tendency of polymer to deposit in said tubes.

2. In a process for recovering wash liquid substantially free of polymer from washings obtained by washing a solid olefin polymer in admixture with soluble polymer of the same olefin and monomer of said olefin comprising the steps of:
   (a) feeding said washings into a fractional distillation column and there distilling same so as to recover an overhead vapor stream of said monomer and lighter material in minor amount, a bottoms liquid stream of said monomer and said soluble polymer of substantially higher polymer concentration than in said washings, and a side stream of said monomer substantially free of said light material as the recovered wash liquid;
   (b) dividing the bottoms stream of step (a) into two streams;
   (c) passing one stream of step (b) in liquid form thru indirect heat exchange tubes of a reboiler in indirect heat exchange with a heating fluid so as to heat said stream and returning the heated stream to the bottom section of said column as reboil liquid, whereby at least some of said polymer deposits in said tubes and causes fouling of same;

the improvement comprising:

(d) prior to feeding a substantial portion of the washings into the fractional distillation column admixing the washings feed of step (a) with the stream of step (c) prior to passing same thru said reboiler tubes so as to increase liquid flow rates thru said tubes and decrease polymer concentration in the resulting mixed stream, thereby decreasing polymer deposition in said tubes.

3. The process of claim 1 wherein said olefin is propylene and said polymer is polypropylene.

4. In a process for recovering a light liquid hydrocarbon from a solution of a polymer in said liquid hydrocarbon comprising the steps of:

(a) feeding a stream of said solution into a fractional distillation column and there distilling same so as to recover an overhead vapor stream of light material, a side stream of said liquid hydrocarbon, and a bottoms stream of said liquid hydrocarbon and said polymer of substantially higher polymer concentration than in the feed stream;

(b) dividing the bottoms stream of step (a) into two streams;

(c) passing one of the streams of step (b) in liquid form thru indirect heat exchange tubes in a reboiler in indirect heat exchange with a heating fluid so as to heat said one stream and returning the heated stream to the bottom section of said column as reboil liquid, whereby a substantial portion of said polymer deposits in said tubes and causes fouling of same;

the improvement comprising:

(d) prior to feeding a substantial portion of the washings into the fractional distillation column admixing the feed stream of (a) with the stream of step (c) prior to passing same thru the tubes in step (c), thereby increasing liquid flow rates thru said tubes, decreasing polymer concentration in the liquid stream passing thru said tubes, and substantially decreasing polymer deposition in said tubes.

5. Apparatus comprising in combination:

(1) a fractionating column having an overhead outlet, a side stream outlet, a bottoms outlet, and an inlet for reboil liquid in a bottom section above said bottoms outlet;

(2) a reboiler having indirect heat exchange tubes therein and inlet and outlet means for circulating heating fluid around said tubes;

(3) a bottoms effluent line connecting with the bottoms outlet of (1) having a pump therein;

(4) conduit means connecting the line of (3) downstream of said pump with one end of the tubes of (2) and the inlet for reboil liquid of (1) with the other end of said tubes for circulating a portion of the bottoms effluent thru the reboiler of (2) back to the column of (1); and (5) a feed line means for passing polymer feed to said column connecting with the conduit means of (4) upstream of the reboiler of (2).

6. The apparatus of claim 5 including:

(6) a stripping vessel having an inlet for bottoms effluent, an inlet for stripping gas in a bottom section, an overhead outlet for vapor, and a bottoms outlet for stripped liquid;

(7) conduit means connecting the effluent line of (3) with the inlet for bottoms effluent of (6) downstream of its juncture with conduit means of (4);

(8) conduit means connecting the overhead outlet of (6) with the inlet for reboil liquid of (1); and (9) means for proportioning the flow of bottoms effluent thru the conduit means of (4) and the conduit means of (7).

References Cited

UNITED STATES PATENTS

| | | | |
|---|---|---|---|
| 2,510,548 | 6/1950 | Brunjes | 202—154 |
| 2,993,841 | 7/1961 | Sarno | 203—9 XR |
| 2,996,492 | 8/1961 | Tegge et al. | 260—94.9 XR |
| 3,084,149 | 4/1963 | Stevens et al. | 260—94.9 |
| 3,197,454 | 7/1965 | Plaster | 260—94.9 XR |
| 3,216,909 | 12/1965 | Bress | 202—154 |
| 3,257,372 | 6/1966 | Moon | 260—93.7 |

NORMAN YUDKOFF, *Primary Examiner.*

D. EDWARDS, *Assistant Examiner.*